(12) United States Patent
Brodnex

(10) Patent No.: US 10,176,733 B1
(45) Date of Patent: Jan. 8, 2019

(54) PERMIT HOLDER FOR A VEHICLE SUN VISOR

(71) Applicant: Elijah Brodnex, Lorain, OH (US)

(72) Inventor: Elijah Brodnex, Lorain, OH (US)

( * ) Notice: Subject to any disclaimer, the term of this patent is extended or adjusted under 35 U.S.C. 154(b) by 0 days.

(21) Appl. No.: 15/641,374

(22) Filed: Jul. 5, 2017

(51) Int. Cl.
| | |
|---|---|
| B60R 7/05 | (2006.01) |
| G09F 7/22 | (2006.01) |
| B60R 7/08 | (2006.01) |
| G09F 7/20 | (2006.01) |
| B60R 11/00 | (2006.01) |
| G09F 7/18 | (2006.01) |

(52) U.S. Cl.
CPC ............ *G09F 7/22* (2013.01); *B60R 7/05* (2013.01); *B60R 7/08* (2013.01); *G09F 7/20* (2013.01); *B60R 2011/0035* (2013.01); *B60R 2011/0059* (2013.01); *B60R 2011/0071* (2013.01); *G09F 2007/1847* (2013.01); *G09F 2007/1865* (2013.01)

(58) Field of Classification Search
CPC .............................. B60R 7/05; Y10T 24/4406
USPC ................................... 40/643, 644, 593
See application file for complete search history.

(56) References Cited

U.S. PATENT DOCUMENTS

| | | | | |
|---|---|---|---|---|
| 4,961,249 | A | * | 10/1990 | Liu ................. B42F 9/001 24/500 |
| 5,611,591 | A | * | 3/1997 | Van Devender ....... B60J 3/0208 296/97.6 |
| 5,613,725 | A | | 3/1997 | Lozano |
| 6,189,947 | B1 | * | 2/2001 | Annan ................. B60J 3/0208 296/97.11 |
| 6,276,081 | B1 | | 8/2001 | Shedd |
| 6,899,371 | B1 | * | 5/2005 | Hammond ............ B60J 3/0208 296/97.11 |
| 7,150,120 | B1 | | 12/2006 | Naymik |
| 7,373,745 | B1 | | 5/2008 | Massaad |
| 7,686,373 | B1 | | 3/2010 | McCabe |
| D697,556 | S | | 1/2014 | Massaad |
| 2007/0289179 | A1 | | 12/2007 | Mortensen |
| 2008/0148614 | A1 | | 6/2008 | Costar |
| 2011/0067278 | A1 | | 3/2011 | Hulbert |

\* cited by examiner

*Primary Examiner* — Kristina N Junge

(57) ABSTRACT

The permit holder for a vehicle sun visor is configured for use with a vehicle. The permit holder for a vehicle sun visor attaches a parking placard to a sun visor within the vehicle. The parking placard may be: 1) stored in a non-visible manner during the operation of vehicle; and, 2) positioned in a visible manner when the vehicle is parked. The permit holder for a vehicle sun visor comprises a visor clip, a master shaft, a master clip, and a plurality of pivots. The master clip attaches to the parking placard. The master shaft attaches the master clip to the plurality of pivots. The plurality of pivots attaches the master shaft to the visor clip. The visor clip attaches to the sun visor. The plurality of pivots are arranged such that the orientation of the placard is adjustable.

6 Claims, 7 Drawing Sheets

PERMIT HOLDER FOR A VEHICLE SUN VISOR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of instruments including the display of signs, more specifically, a means for attaching a sign to a supporting structure.

SUMMARY OF INVENTION

The permit holder for a vehicle sun visor is configured for use with a vehicle. The vehicle is further defined with a sun visor and a parking placard. The permit holder for a vehicle sun visor attaches the parking placard to the sun visor such that the parking placard may be: 1) stored in a non-visible manner during the operation of vehicle; and, 2) positioned in a visible manner when the vehicle is parked. The permit holder for a vehicle sun visor comprises a visor clip, a master shaft, a master clip, and a plurality of pivots. The master clip attaches the parking placard to the permit holder for a vehicle sun visor. The master shaft attaches the master clip to the plurality of pivots. The plurality of pivots attaches the master shaft to the visor clip. The visor clip attaches the permit holder for a vehicle sun visor to the sun visor. The plurality of pivots are arranged such that the orientation of the placard is adjustable over an azimuth angle and an altitude angle.

These together with additional objects, features and advantages of the permit holder for a vehicle sun visor will be readily apparent to those of ordinary skill in the art upon reading the following detailed description of the presently preferred, but nonetheless illustrative, embodiments when taken in conjunction with the accompanying drawings.

In this respect, before explaining the current embodiments of the permit holder for a vehicle sun visor in detail, it is to be understood that the permit holder for a vehicle sun visor is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the permit holder for a vehicle sun visor.

It is therefore important that the claims be regarded as including such equivalent construction insofar as they do not depart from the spirit and scope of the permit holder for a vehicle sun visor. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
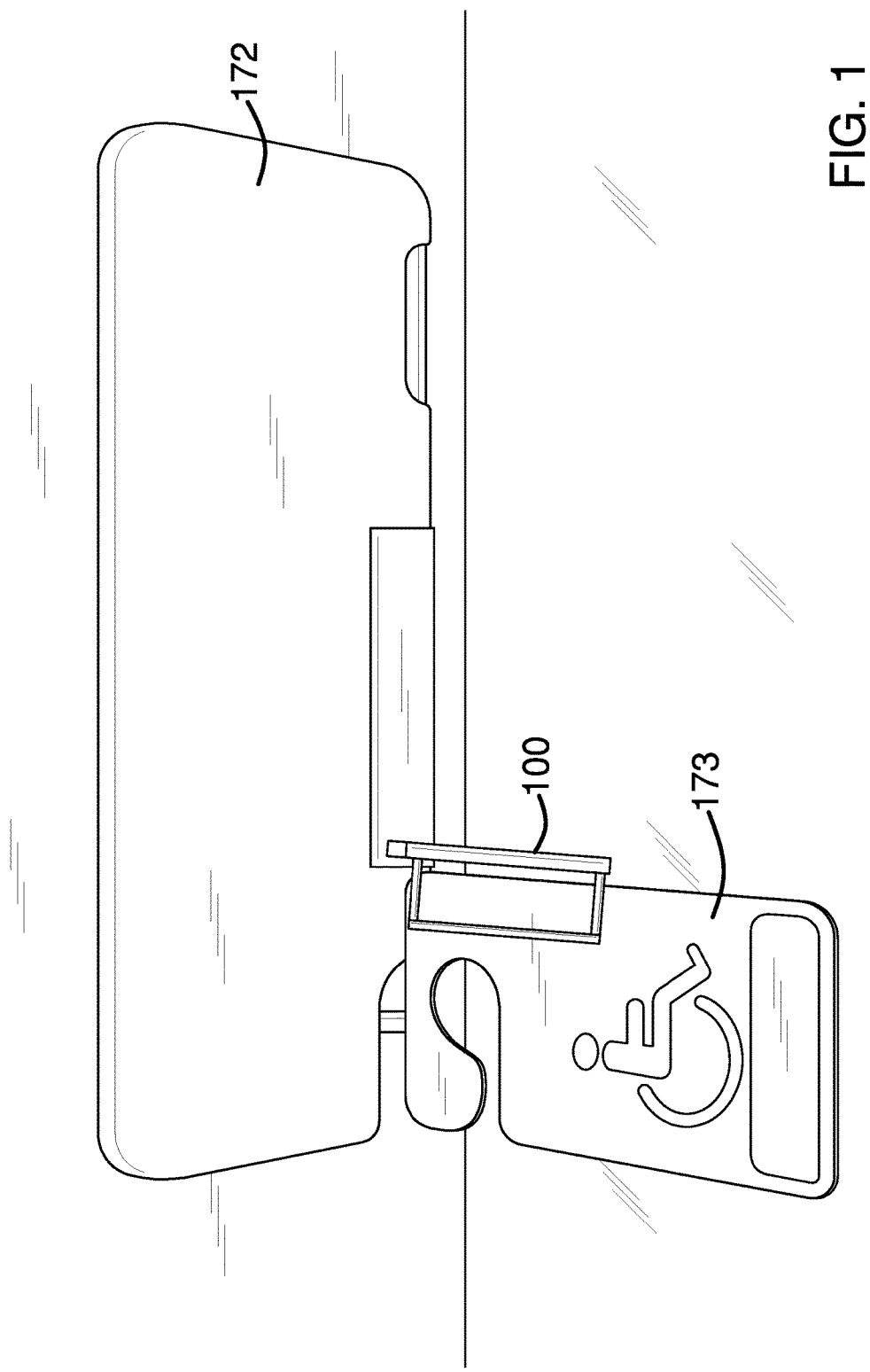
FIG. 1 is an in use view of an embodiment of the disclosure.
Figure 2:
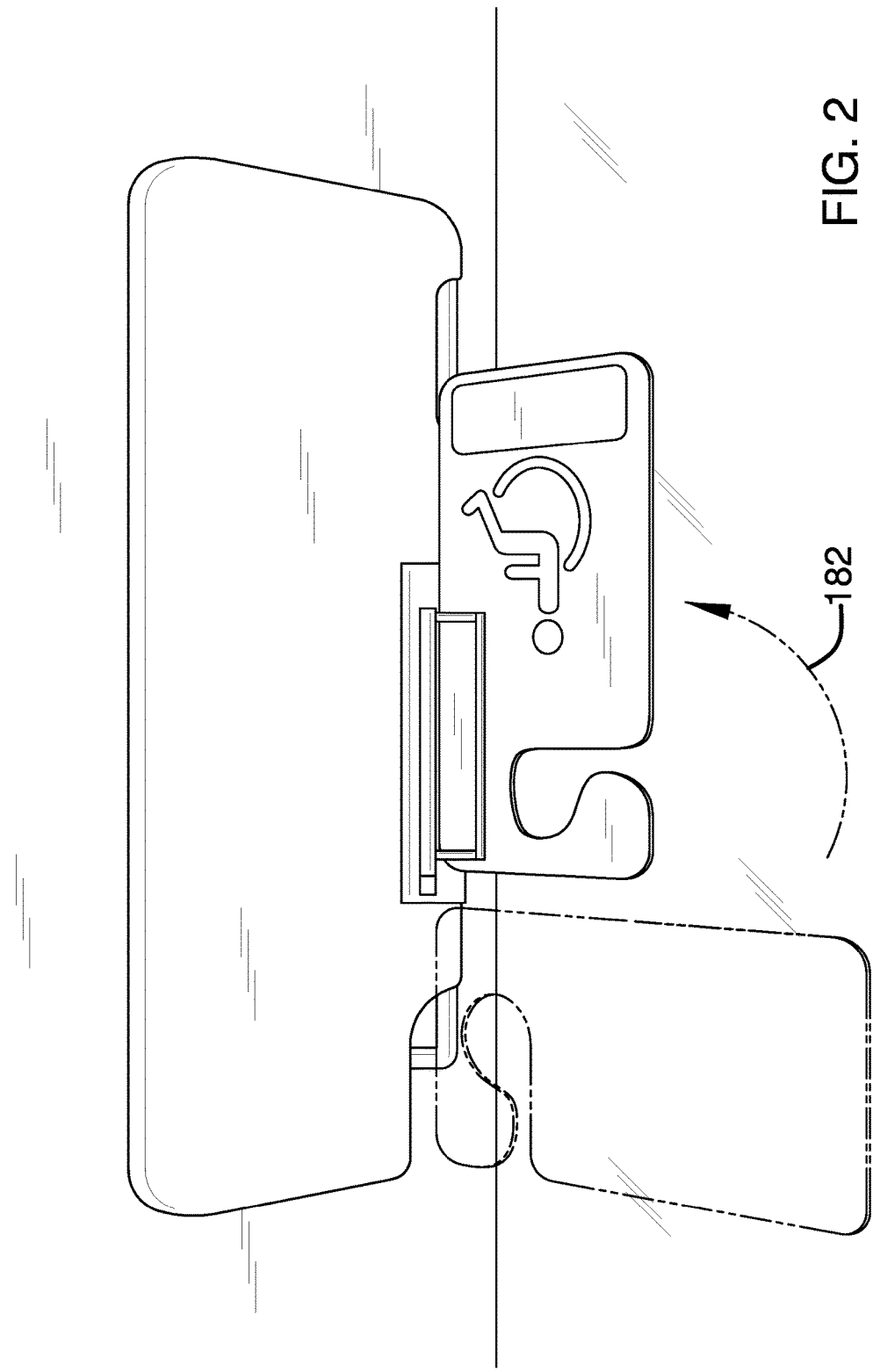
FIG. 2 is an in use view of an embodiment of the disclosure.
Figure 3:
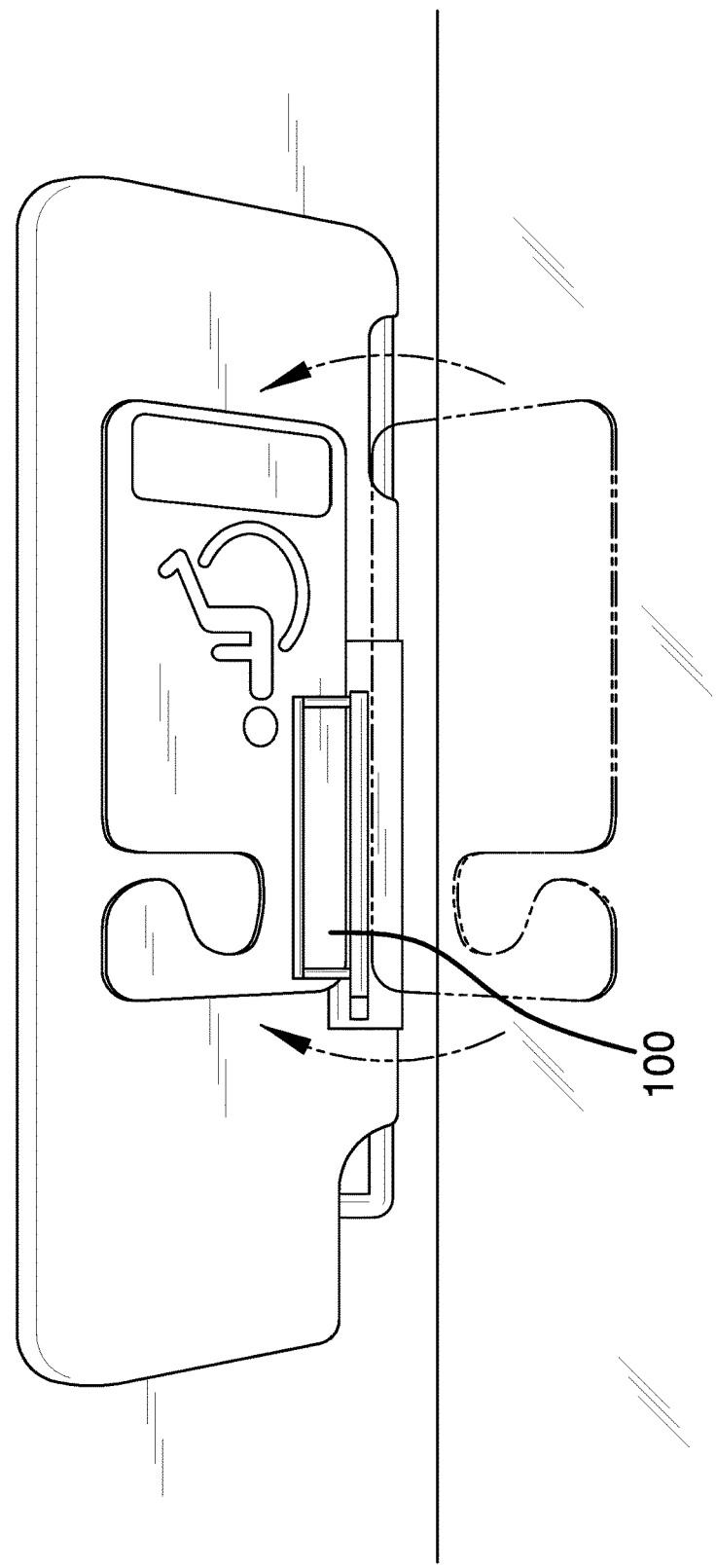
FIG. 3 is an in use view of an embodiment of the disclosure.
Figure 4:
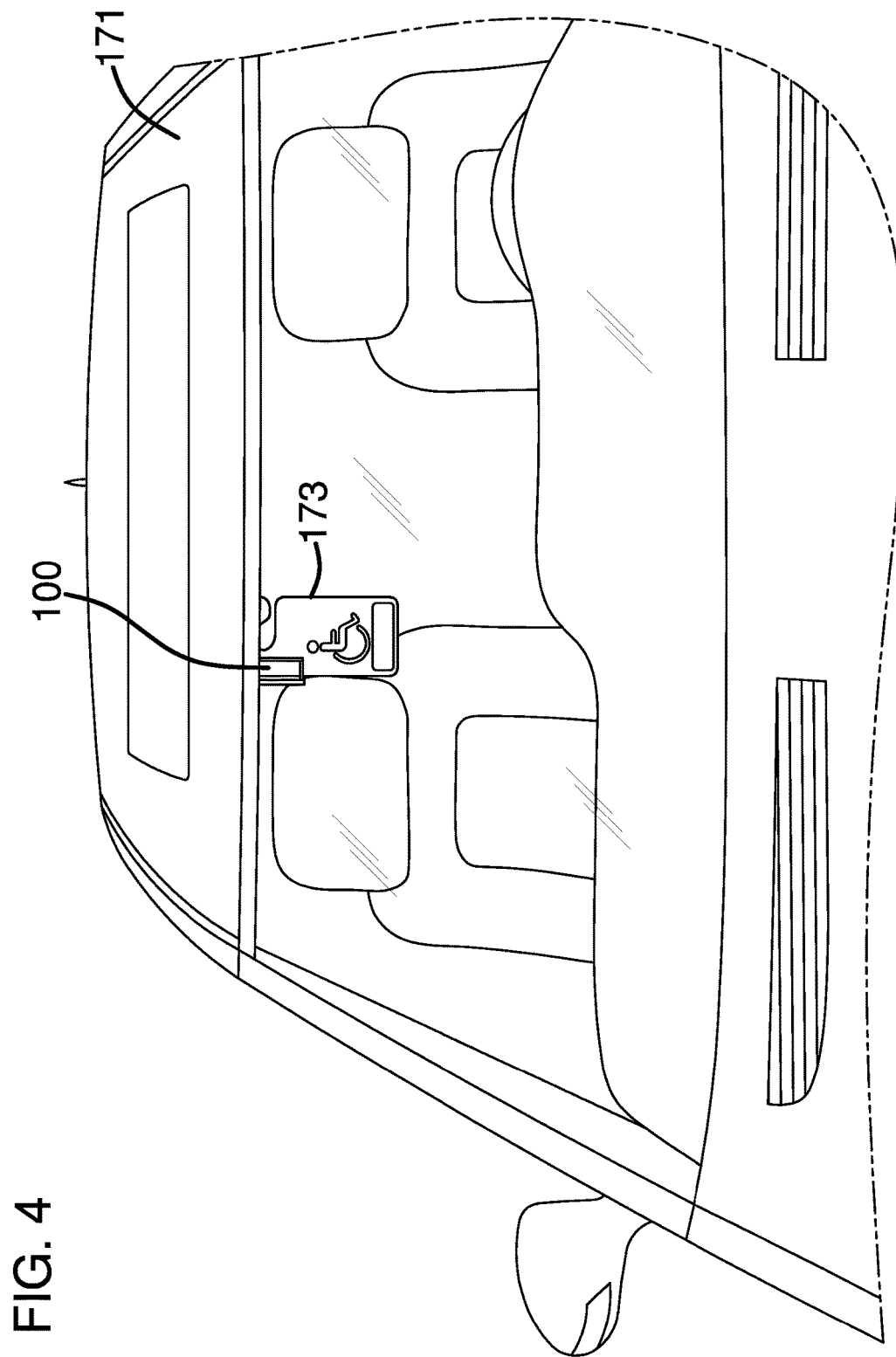
FIG. 4 is an in use view of an embodiment of the disclosure.
Figure 5:
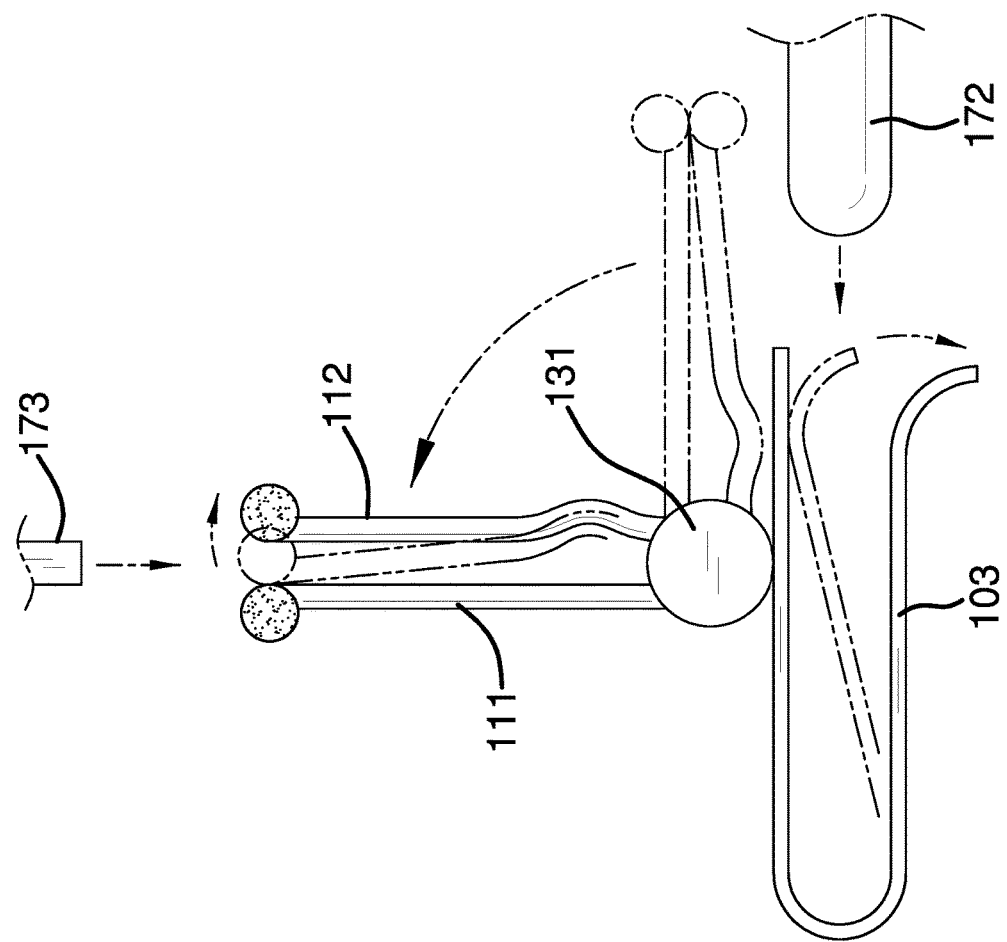
FIG. 5 is a side view of an embodiment of the disclosure.
Figure 6:
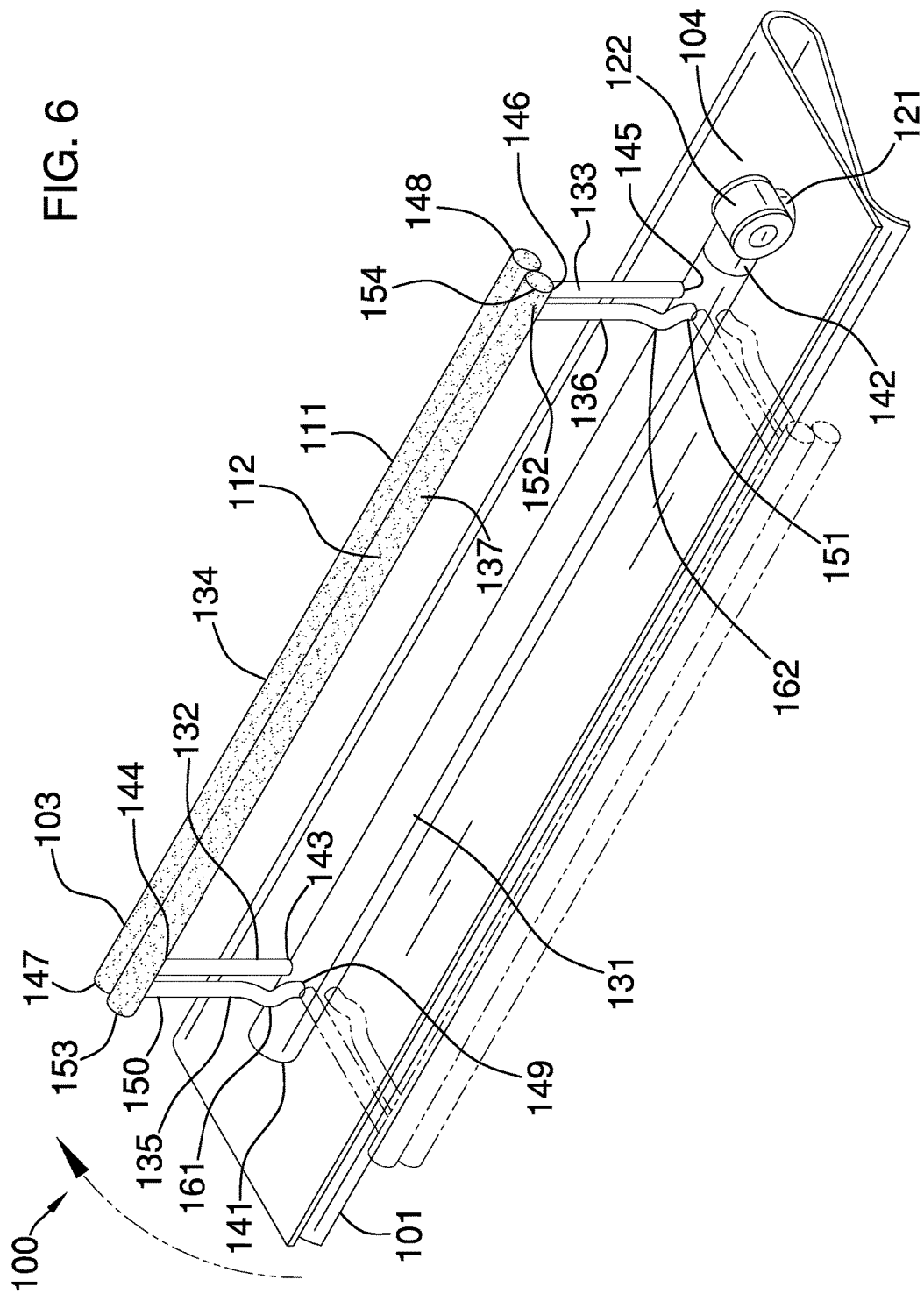
FIG. 6 is a perspective view of an embodiment of the disclosure.
Figure 7:
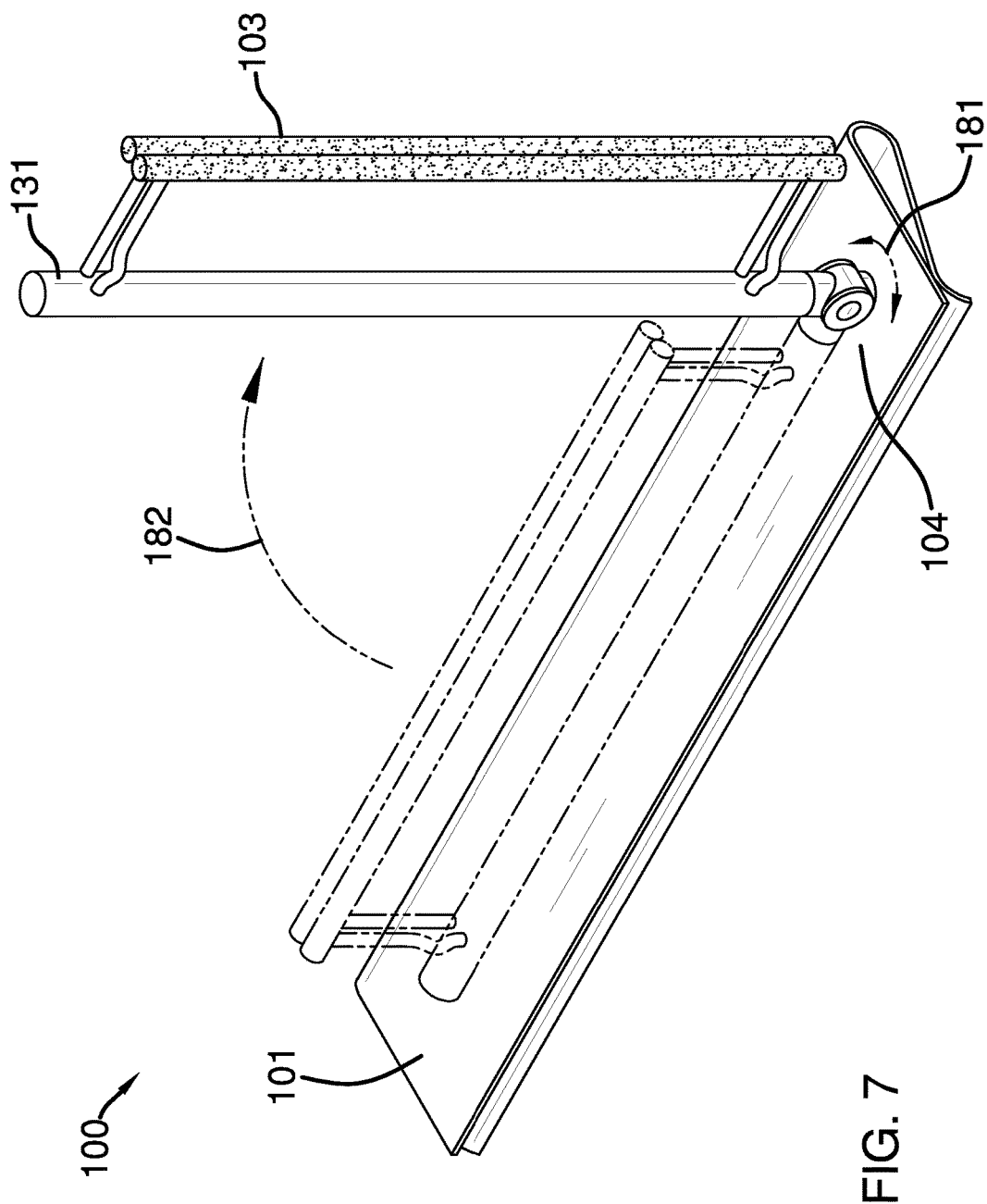
FIG. 7 is a perspective view of an embodiment of the disclosure.

Detailed reference will now be made to one or more potential embodiments of the disclosure, which are illustrated in FIGS. 1 through 7.

The permit holder for a vehicle sun visor 100 (hereinafter invention) is configured for use with a vehicle 171. The vehicle 171 is assumed to be an automobile that is further defined with a sun visor 172 and a parking placard 173. The parking placard 173 is a sign that displays an indicia conveying a sentiment. The invention 100 attaches the parking placard 173 to the sun visor 172 such that the parking placard 173 may be: 1) stored in a non-visible manner during the operation of vehicle 171; and, 2) positioned in a visible manner when the vehicle 171 is parked. The invention 100 comprises a visor clip 101, a master shaft, a master clip 103, and a plurality of pivots 104. The master clip 103 attaches the parking placard 173 to the invention 100. The master shaft attaches the master clip 103 to the plurality of pivots 104. The plurality of pivots 104 attaches the master shaft to the visor clip 101. The visor clip 101 attaches the invention 100 to the sun visor 172. The plurality of pivots 104 are arranged such that the orientation of the placard is adjustable over an azimuth angle 181 and an altitude angle 182.

The visor clip 101 is a mechanical structure that attaches the invention 100 to the sun visor 172 of the vehicle 171. The visor clip 101 is formed in the manner of a cantilever V spring into which is inserted the sun visor 172.

The master shaft is a cylindrical shaft, which is used to support master clip 103. The master shaft comprises a first shaft 131. The first shaft 131 is further defined with a first end 141 and a second end 142. The first shaft 131 is a commercially available cylindrical shaft that forms the master shaft.

The master clip 103 is a spring like clip that attaches the parking placard 173 to the invention 100. The master clip 103 comprises a fixed arm 111 and a flexible arm 112.

The fixed arm 111 is a fixed structure against which the parking placard 173 is pressed by the flexible arm 112. The fixed arm 111 comprises a second shaft 132, a third shaft 133, and a fourth shaft 134. The second shaft 132 is further defined with a third end 143 and a fourth end 144. The third shaft 133 is further defined with a fifth end 145 and a sixth end 146. The fourth shaft 134 is further defined with a seventh end 147 and an eighth end 148. The second shaft 132 is a commercially available cylindrical shaft. The third shaft 133 is a commercially available cylindrical shaft. The fourth shaft 134 is a commercially available cylindrical shaft. The fourth shaft 134 is coated in an elastomeric material such as latex to increase the tack of the master clip 103.

The flexible arm 112 is a flexible structure, which performs in the manner of a spring. The flexible arm 112 is positioned such that the flexible arm 112 applies pressure against the fixed arm 111 when the flexible arm 112 is in a relaxed position. The flexible arm 112 comprises a fifth shaft 135, a sixth shaft 136, and a seventh shaft 137.

The fifth shaft 135 is a cylindrical shaft that is formed with a first flexure 161. The sixth shaft 136 is a cylindrical shaft that is formed with a second flexure 162. The seventh shaft 137 is a commercially available cylindrical shaft. The seventh shaft 137 is coated in an elastomeric material such as latex to increase the tack of the master clip 103. The fifth shaft 135 is further defined with a ninth end 149 and a tenth end 150. The sixth shaft 136 is further defined with an eleventh end 151 and a twelfth end 152. The seventh shaft 137 is further defined with a thirteenth end 153 and a fourteenth end 154.

The first flexure 161 is a bend that is formed within the fifth shaft 135. The first flexure 161 forms a type of living hinge that allows the fifth shaft 135 to be bent in the manner of a cantilever spring. The second flexure 162 is a bend that is formed within the sixth shaft 136. The second flexure 162 forms a type of living hinge that allows the sixth shaft 136 to be bent in the manner of a cantilever spring.

The plurality of pivots 104 attaches the master shaft to the visor clip 101. The plurality of pivots 104 comprises a collection of individual bearings that are arranged to allow for the rotation of the master clip 103 across both the azimuth angle 181 and the altitude angle 182 when the sun visor 172 is in the stored position. The use of the plurality of pivots 104 allows the orientation of the parking placard 173 relative to the sun visor 172 to be adjusted for the purpose of maximizing or minimizing the visibility of the parking placard 173. Each bearing selected for use in the plurality of pivots 104 comprises a locking mechanism that allows the orientation of the master shaft to be locked into place.

The azimuth angle 181 refers to a rotational plane that is roughly parallel to the horizon when the sun visor 172 is in a stored position. The azimuth angle 181 is described in greater detail elsewhere in this disclosure. The altitude angle 182 refers to a rotational plane that is roughly perpendicular to the horizon when the sun visor 172 is in a stored position. The altitude angle 182 is described in greater detail elsewhere in this disclosure.

The plurality of pivots 104 comprises an azimuth bearing 121 and an altitude bearing 122. The azimuth bearing 121 is a commercially available bearing that is used to adjust the azimuth angle 181 of the master shaft. The altitude bearing 122 is a commercially available bearing that is used to adjust the altitude angle 182 of the master shaft.

The invention 100 is assembled as described in the following three paragraphs.

The azimuth bearing 121 attaches the altitude bearing 122 to the visor clip 101 such that the azimuth angle 181 of the altitude bearing 122 can be adjusted. The second end 142 of the first shaft 131 attaches to the altitude bearing 122 such that the altitude angle 182 of the first shaft 131 can be adjusted.

The third end 143 of the second shaft 132 attaches to the face of the first shaft 131. The fifth end 145 of the third shaft 133 attaches to the face of the first shaft 131. The fourth end 144 of the second shaft 132 attaches to the seventh end 147 of the fourth shaft 134. The sixth end 146 of the third shaft 133 attaches to the eighth end 148 of the fourth shaft 134.

The ninth end 149 of the fifth shaft 135 attaches to the face of the first shaft 131. The eleventh end 151 of the sixth shaft 136 attaches to the face of the first shaft 131. The tenth end 150 of the fifth shaft 135 attaches to the thirteenth end 153 of the seventh shaft 137. The twelfth end 152 of the sixth shaft 136 attaches to the fourteenth end 154 of the seventh shaft 137. The invention 100 is assembled such that the fourth shaft 134 physically contacts the seventh shaft 137.

To use the invention 100, the sun visor 172 of the vehicle 171 is inserted into the cantilever V structure of the visor clip 101. The flexible arm 112 of the master clip 103 is bent away from the fixed arm 111 of the master clip 103 such that the parking placard 173 can be placed between the fixed arm 111 and the flexible arm 112. Once the flexible arm 112 returns to its relaxed shape, the parking placard 173 will be held in position between the fixed arm 111 and the flexible arm 112. Using the plurality of pivots 104, the first shaft 131 can then be rotated around the azimuth angle 181 and the altitude angle 182 to position the parking placard 173.

The following definitions were used in this disclosure:

Altitude: As used in this disclosure, the altitude, or altitude angle, refers to an angle that is measured in a plane that is: 1) parallel to the force of gravity; and, 2) perpendicular to the azimuth.

Automobile: As used in this disclosure, an automobile is a road vehicle that that specializes in carrying passengers and light cargo loads. This definition is specifically intended to include vehicles generally referred to as pickup trucks, vans, minivans, and sport utility vehicles.

Azimuth: As used in this disclosure, the azimuth, or azimuth angle, refers to an angle that is measured in a plane that is perpendicular to the either the vertical direction or the force of gravity.

Bearing: As used in this disclosure, a bearing is a mechanical device that: 1) guides and limits the motion of a moving component relative to a fixed component; and, 2) reduces the friction between the moving component and the fixed component. The use of bearings is well known and documented in the mechanical arts.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end. The cantilever acts as a spring. Specifically, when a force is applied perpendicularly to the surface of the cantilever, the elasticity of the cantilever creates a rotational torque that opposes the displacement created by rotating the cantilever around a pivot point located at the first end where the cantilever is attached to the receptacle. This rotational torque places a strain on the cantilever such that the force of the strain is in the direction that returns the cantilever to its original position. When an object is inserted between the cantilever and the receptacle, this spring like action produces a clamping force that holds the invention securely in position against the object.

Cantilever V Spring: As used in this disclosure, a cantilever V spring is a torsion spring that is formed in a chevron shape. The cantilever V spring comprises a first cantilever structure and a second cantilever structure wherein the fixed end of the first cantilever structure is attached to the fixed end of the second cantilever structure. Within this structure, when a force is applied to the cantilever V spring such that the first cantilever structure moves relative to from the second cantilever structure the force deforms the cantilever V spring in an elastic manner that: 1) resists the application of the force; and 2) stores the energy deformation such that when the force is no longer applied the cantilever V spring returns to its relaxed shape. Depending on the application, a cantilever V spring can be considered a torsion spring, a tension spring, or a compression spring.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or cone like structure. When the center axes of two cylinder or like structures share the same line they are said to be aligned. When the center axes of two cylinder like structures do not share the same line they are said to be offset.

Chevron: As used in this disclosure, chevron is a term that is used to describe an object that has the shape of a U or a V.

Clip: As used in this disclosure, a clip is a fastener that attaches to an object by gripping or clasping the object.

Cylinder: As used in this disclosure, a cylinder is a geometric structure defined by two identical flat and parallel ends, also commonly referred to as bases, which are circular in shape and connected with a single curved surface, referred to in this disclosure as the face. The cross section of the cylinder remains the same from one end to another. The axis of the cylinder is formed by the straight line that connects the center of each of the two identical flat and parallel ends of the cylinder. Unless otherwise stated within this disclosure, the term cylinder specifically means a right cylinder which is defined as a cylinder wherein the curved surface perpendicularly intersects with the two identical flat and parallel ends.

Elastic: As used in this disclosure, an elastic is a material or object that deforms when a force is applied to it and that is able to return to its original shape after the force is removed. A material that exhibits these qualities is also referred to as an elastomeric material.

Flexure Bearing: As used in this disclosure, a flexure bearing is a thin and flexible material that is used to attach, or bind, a first object to a second object such that the first object can rotate in a controlled direction relative to the second object.

Force Of Gravity: As used in this disclosure, the force of gravity refers to a vector that indicates the direction of the pull of gravity on an object at or near the surface of the earth.

Hinge: As used in this disclosure, a hinge is a device that permits the turning, rotating, or pivoting of a first object relative to a second object.

Image: As used in this disclosure, an image is an optical representation or reproduction of an indicia or of the appearance of something or someone.

Indicia: As used in this disclosure, the term indicia refers to a set of markings that identify a sentiment.

Living Hinge: As used in this disclosure, refers to a single object that is formed out of elastomeric material that is divided into a first segment, a second segment and the living hinge. The elastic nature of the elastomeric material allow the living hinge to be flexed in the manner of a hinge allowing the first segment to rotate relative to the second hinge. The living hinge is a form of a flexure bearing. A material that is formed with a series of parallel living hinges is referred to as a kerf bending. A kerf bending formed in a plate allows the plate to be bent into a curved shape.

Orientation: As used in this disclosure, orientation refers to the positioning of a first object relative to: 1) a second object; or, 2) a fixed position, location, or direction.

Park: As used in this disclosure, park refers to: 1) a space or area dedicated for a specific purpose such as a recreational park, an industrial park, a ball park, or a parking lot; or, 2) to a prepare an object for and the place in a stationary location particularly when the object is a vehicle.

Pivot: As used in this disclosure, a pivot is a rod or shaft around which an object rotates or swings.

Polar: As used in this disclosure, the polar, or polar angle, refers to an angle that is measured in a plane that is parallel to either the vertical direction or the force of gravity.

Prism: As used in this disclosure, a prism is a 3 dimensional geometric structure wherein: 1) the form factor of two faces of the prism correspond to each other; and, 2) the two corresponding faces are parallel to each other. In this disclosure, when further description is required a prism will be named for the geometric or descriptive name of the form factor of the two corresponding faces. If the form factor of the two corresponding faces has no clearly established or well-known geometric or descriptive name, the term irregular prism will be used. The center axis of a prism is defined as a line that joins the center point of the first corresponding face of the prism to the center point of the second corresponding face of the prism. The center axis of a prism is otherwise analogous the center axis of a cylinder.

Relaxed Shape: As used in this disclosure, a structure is considered to be in its relaxed state when no shear, strain, or torsional forces are being applied to the structure.

Sentiment: As used in this disclosure, a sentiment refers to a symbolic meaning or message that is communicated through the use of an image, potentially including a text based image.

Sign: As used in this disclosure, a sign is a placard that displays an image, potentially including a text based image, which contains some form of a sentiment.

Spring: As used in this disclosure, a spring is a device that is used to store mechanical energy. This mechanical energy will often be stored by: 1) deforming an elastomeric material that is used to make the device; 2) the application of a torque to a rigid structure; or 3) a combination of the previous two items.

Tack: As used in this disclosure, tack refers to a measure of the bonding strength of an adhesive. The greater the bonding strength the more tack the adhesive is said to have.

Torsion Spring: As used in this disclosure, a torsion spring is a mechanical device that stores mechanical energy through an opposing torque when the mechanical device is twisted. The torsion spring will return to its original relaxed shape when the twisting force is removed.

Vehicle: As used in this disclosure, a motorized vehicle is a device that is used for transporting passengers, goods, or equipment. The term motorized vehicle refers to a vehicle can move under power provided by an electric motor or an internal combustion engine.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A structure for supporting a sign comprising:
a visor clip, a master shaft, a master clip, and a plurality of pivots;
wherein the master clip attaches to a parking placard;
wherein the master shaft and the plurality of pivots attaches the master clip to the visor clip;
wherein the visor clip attaches to a sun visor of a vehicle;
wherein the structure attaches the parking placard to the sun visor such that the parking placard can be stored in a non-visible manner;
wherein the structure attaches the parking placard to the sun visor such that the parking placard can be positioned in a visible manner;
wherein an orientation of the parking placard is adjustable over an azimuth angle and an altitude angle;
wherein the visor clip is a mechanical structure;
wherein the visor clip is a cantilever V spring into which is inserted the sun visor;
wherein the master shaft comprises a first shaft;
wherein the first shaft is a cylindrical shaft;
wherein the first shaft is further defined with a first end and a second end;
wherein the master clip comprises a fixed arm and a flexible arm;
wherein the fixed arm is a fixed structure against which the parking placard is pressed by the flexible arm;
wherein the fixed arm comprises a second shaft, a third shaft, and a fourth shaft;
wherein the fourth shaft attaches the second shaft to the third shaft;
wherein the second shaft is further defined with a third end and a fourth end;
wherein the third shaft is further defined with a fifth end and a sixth end;
wherein the fourth shaft is further defined with a seventh end and an eighth end;
wherein the second shaft is a cylindrical shaft;
wherein the third shaft is a cylindrical shaft;
wherein the fourth shaft is a cylindrical shaft;
wherein the fourth shaft is coated in an elastomeric material;
wherein the flexible arm is a spring;
wherein the flexible arm is positioned such that the flexible arm applies pressure against the fixed arm when the flexible arm is in a relaxed position;
wherein the flexible arm comprises a fifth shaft, a sixth shaft, and a seventh shaft;
wherein the seventh shaft attaches the fifth shaft to the sixth shaft;
wherein the fifth shaft is a shaft;
wherein the sixth shaft is a shaft;
wherein the seventh shaft is a cylindrical shaft;
wherein the seventh shaft is coated in an elastomeric material;
wherein the fifth shaft is further defined with a ninth end and a tenth end;
wherein the sixth shaft is further defined with an eleventh end and a twelfth end;
wherein the seventh shaft is further defined with a thirteenth end and a fourteenth end;
wherein the fifth shaft is formed with a first flexure;
wherein the first flexure is a bend that is formed within the fifth shaft;
wherein the sixth shaft is formed with a second flexure;
wherein the second flexure is a bend that is formed within the sixth shaft;
wherein the first flexure forms a living hinge;
wherein the second flexure forms a living hinge;
wherein the plurality of pivots attaches the master shaft to the visor clip;
wherein the plurality of pivots comprises a collection of individual bearings that are arranged to allow for the rotation of the master clip across both the azimuth angle and the altitude angle when the sun visor is in the stored position;
wherein each bearing selected for use in the plurality of pivots comprises a locking mechanism;
wherein the plurality of pivots comprises an azimuth bearing and an altitude bearing;
wherein the azimuth bearing adjusts the azimuth angle of the master clip;
wherein the altitude bearing adjusts the altitude angle of the master clip;
wherein the azimuth bearing attaches the altitude bearing to the visor clip such that the azimuth angle of the altitude bearing can be adjusted.

2. The structure according to claim 1 wherein the second end of the first shaft attaches to the altitude bearing such that the altitude angle of the first shaft can be adjusted.

3. The structure according to claim 2
wherein the third end of the second shaft attaches to a face of the first shaft;
wherein the fifth end of the third shaft attaches to the face of the first shaft;
wherein the fourth end of the second shaft attaches to the seventh end of the fourth shaft;
wherein the sixth end of the third shaft attaches to the eighth end of the fourth shaft.

4. The structure according to claim 3
wherein the ninth end of the fifth shaft attaches to the face of the first shaft;
wherein the eleventh end of the sixth shaft attaches to the face of the first shaft;
wherein the tenth end of the fifth shaft attaches to the thirteenth end of the seventh shaft;
wherein the twelfth end of the sixth shaft attaches to the fourteenth end of the seventh shaft.

5. The structure according to claim 4 wherein the means for attaching a sign to a structure is assembled such that the fourth shaft physically contacts the seventh shaft.

6. The structure according to claim 5 wherein the flexible arm of the master clip bends away from the fixed arm of the master clip such that the parking placard can be placed between the fixed arm and the flexible arm.

* * * * *